(12) United States Patent
Seroka

(10) Patent No.: US 10,981,423 B2
(45) Date of Patent: Apr. 20, 2021

(54) TIRE PROJECTION AND HOUSING SYSTEM

(71) Applicant: Bridgestone Americas Tire Operations, LLC, Nashville, TN (US)

(72) Inventor: Edward S. Seroka, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 332 days.

(21) Appl. No.: 16/063,737

(22) PCT Filed: Dec. 20, 2016

(86) PCT No.: PCT/US2016/067665
§ 371 (c)(1),
(2) Date: Jun. 19, 2018

(87) PCT Pub. No.: WO2017/116821
PCT Pub. Date: Jul. 6, 2017

(65) Prior Publication Data
US 2020/0269635 A1   Aug. 27, 2020

Related U.S. Application Data

(60) Provisional application No. 62/272,130, filed on Dec. 29, 2015.

(51) Int. Cl.
*B60C 11/16* (2006.01)
*B60C 19/08* (2006.01)
*B60C 11/14* (2006.01)

(52) U.S. Cl.
CPC .......... *B60C 11/1637* (2013.01); *B60C 11/14* (2013.01); *B60C 11/16* (2013.01);
(Continued)

(58) Field of Classification Search
CPC ..... B60C 11/14; B60C 11/16; B60C 11/1606; B60C 11/1625; B60C 11/1637;
(Continued)

(56) References Cited

U.S. PATENT DOCUMENTS

| 1,487,623 A | 3/1924 | Thompson |
| 3,301,300 A | 1/1967 | Natter |

(Continued)

FOREIGN PATENT DOCUMENTS

| EP | 2295267 | 3/2011 |
| EP | 2641754 | 9/2013 |

(Continued)

OTHER PUBLICATIONS

Tetsuo Ikegami, JP-2013082309-A, machine translation. (Year: 2013).*

(Continued)

*Primary Examiner* — Robert C Dye
*Assistant Examiner* — Sedef E Paquette

(57) ABSTRACT

A system for mounting a housing and an insert to a tire includes a housing configured to be installed in a tire, wherein the housing has a top opening. The system also includes at least one anchor connected to a side of the housing in an un-deployed configuration. The system further includes an insert configured to be inserted into the top opening of the housing. The at least one anchor projects outward into the tire when the insert is inserted into the top opening of the housing.

14 Claims, 9 Drawing Sheets

(52) U.S. Cl.
CPC ...... B60C 11/1625 (2013.01); B60C 11/1668 (2013.01); B60C 19/082 (2013.01); B60C 11/165 (2013.01)

(58) Field of Classification Search
CPC .............. B60C 11/165; B60C 11/1668; B60C 11/1693; B29D 30/66; B29D 2030/662
USPC ........................................................ 152/210
See application file for complete search history.

(56) References Cited

U.S. PATENT DOCUMENTS

| | | | |
|---|---|---|---|
| 3,593,771 | A | 7/1971 | Ragnar et al. |
| 4,815,513 | A | 3/1989 | Kiyohiro |
| 4,844,137 | A * | 7/1989 | Einarsson ............... B60C 11/16 152/210 |
| 5,198,049 | A | 3/1993 | Hiroo |
| 5,398,742 | A | 3/1995 | Tohichi |
| 5,411,070 | A | 5/1995 | Iraj |
| 5,800,644 | A | 9/1998 | Juhani |
| 6,199,610 | B1 | 3/2001 | Yanagawa |
| 6,374,886 | B1 | 4/2002 | Pentti |
| 6,779,571 | B1 | 8/2004 | Aram |
| 7,032,636 | B2 | 4/2006 | Heikki |
| 8,113,250 | B2 | 2/2012 | Juhani |
| 8,215,353 | B2 | 7/2012 | Collette et al. |
| 2003/0084982 | A1 | 8/2003 | Campbell |
| 2005/0098920 | A1* | 5/2005 | Brivio ................... B29C 31/008 264/277 |
| 2007/0079915 | A1 | 4/2007 | Jones |
| 2007/0144646 | A1 | 6/2007 | Mancia et al. |
| 2011/0146865 | A1 | 6/2011 | Durat et al. |
| 2012/0205018 | A1 | 8/2012 | Roth et al. |
| 2014/0326384 | A1 | 11/2014 | Fabing et al. |
| 2014/0338806 | A1 | 11/2014 | Fabing et al. |

FOREIGN PATENT DOCUMENTS

| | | | |
|---|---|---|---|
| JP | H0354005 | 3/1991 | |
| JP | 2013082309 | 5/2013 | |
| KR | 10-1012287 | 2/2011 | |
| SU | 1533878 | 1/1990 | |
| WO | WO-9010549 A1 * | 9/1990 | ......... B60C 11/1606 |
| WO | WO-0132449 A1 * | 5/2001 | ............. B60C 11/16 |
| WO | 2011110250 | 9/2011 | |
| WO | 2015095106 | 6/2015 | |

OTHER PUBLICATIONS

Tetsuo Ikegami, JP-2013082309-A, updated machine translation. (Year: 2013).*
International Search Report and Written Opinion; Corresponding PCT Application Serial No. PCT/US2016/067665; Authorized Officer Geun Tae Bae; dated Apr. 5, 2017.

* cited by examiner

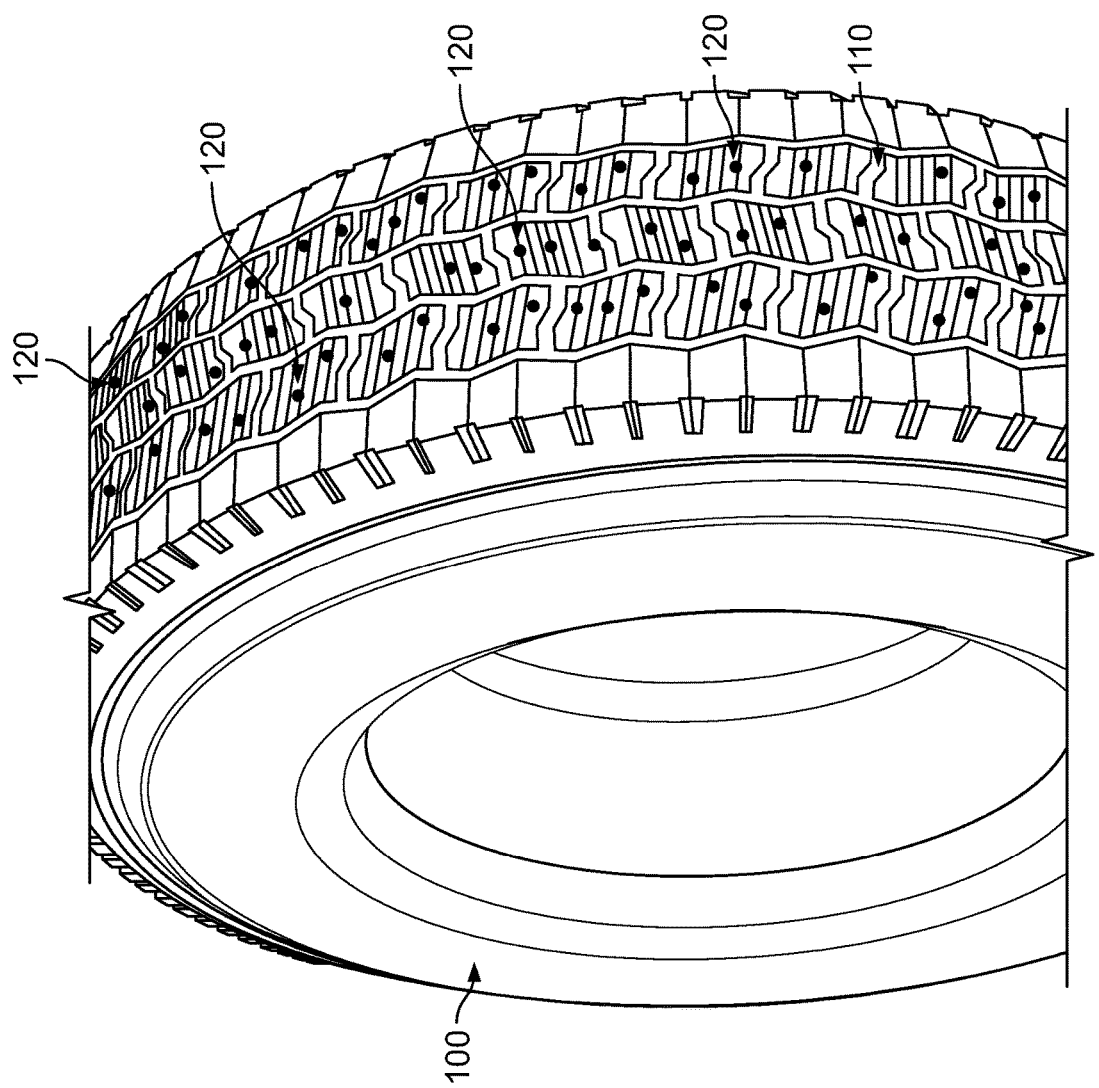

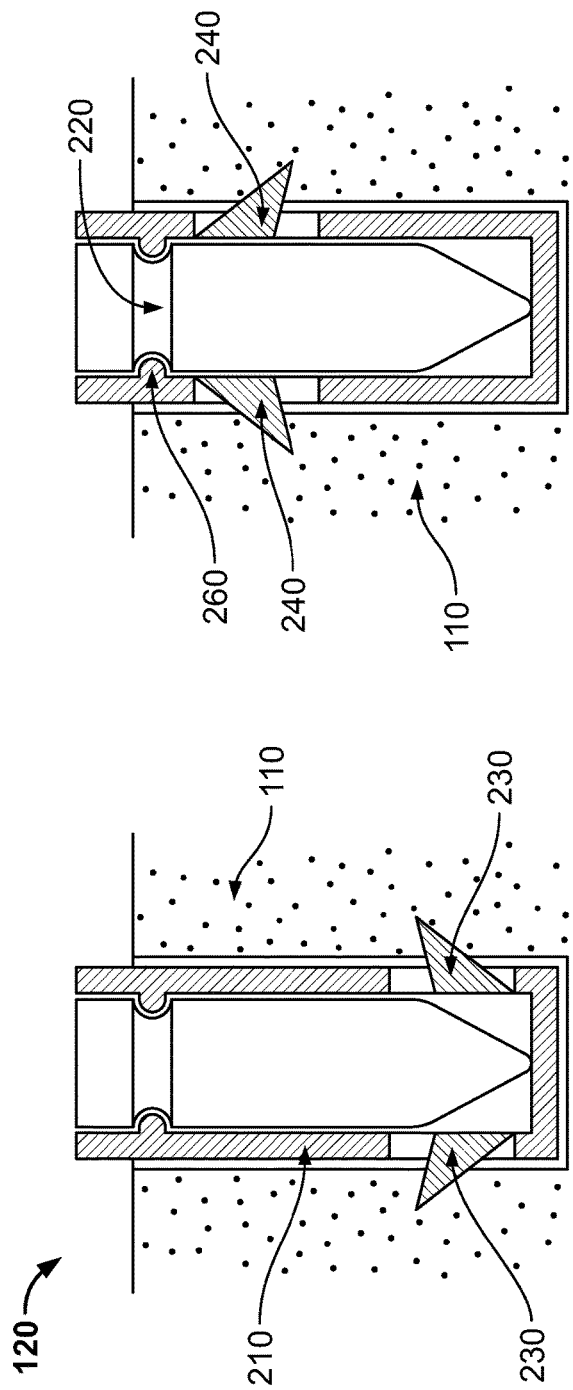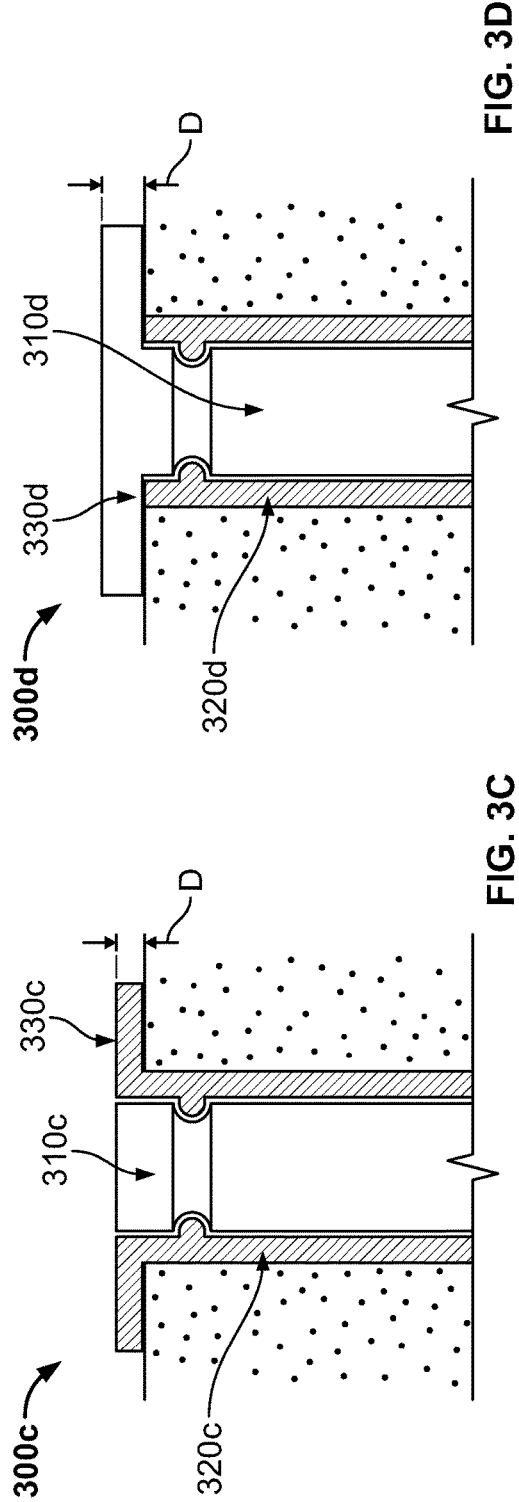

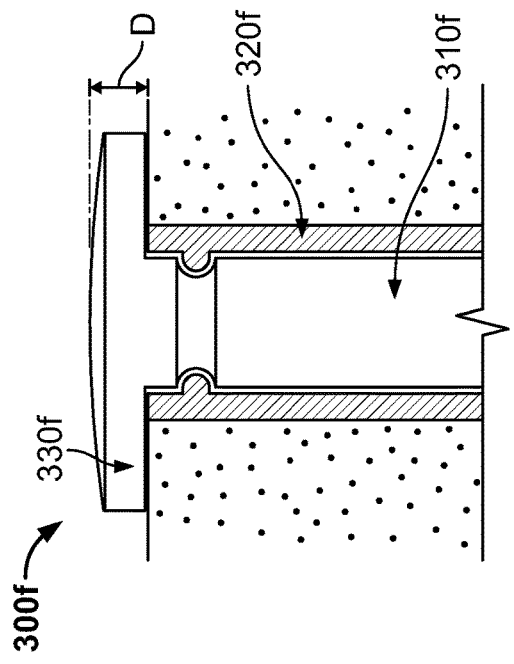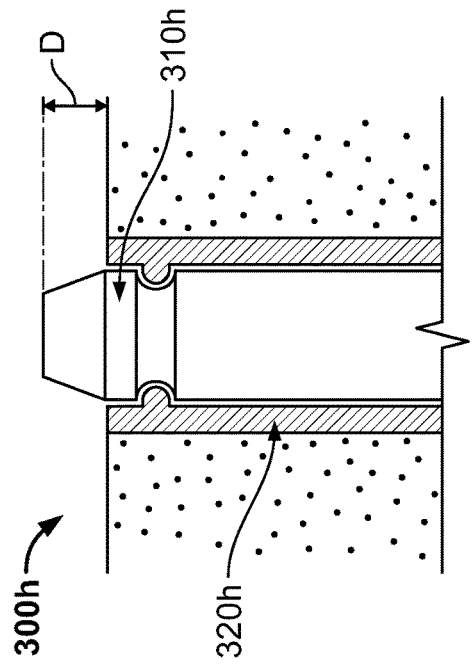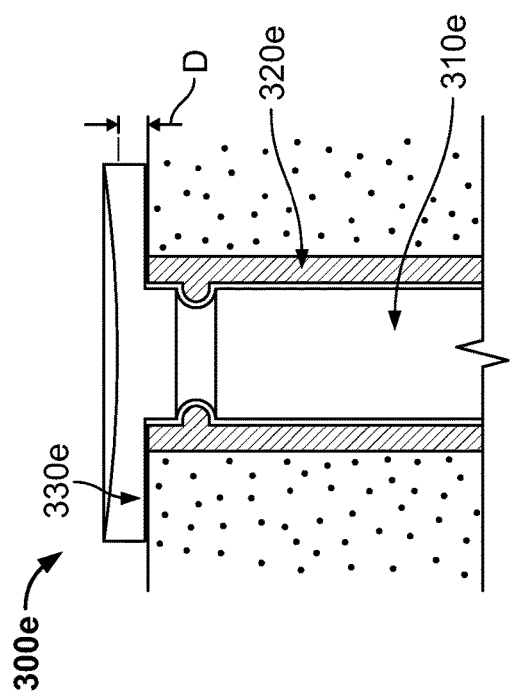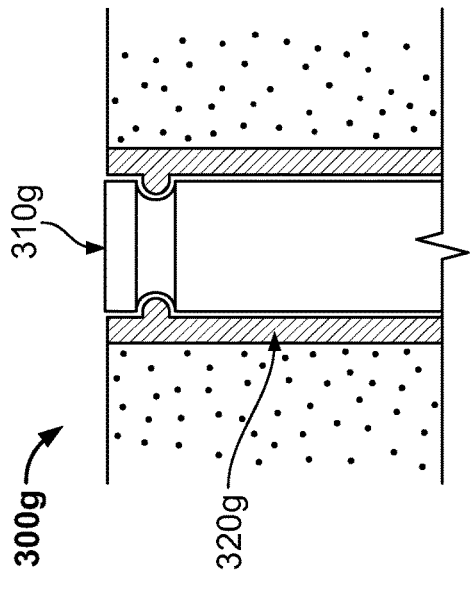

TIRE PROJECTION AND HOUSING SYSTEM

FIELD OF THE INVENTION

The present disclosure relates to enhancing all-season traction in a tire. More particularly, the present disclosure relates to the use of projections that are embedded and anchored into a tire tread surface.

BACKGROUND

Tire traction can be enhanced utilizing studs embedded into the tread of a tire. Studs are embedded using a stud gun, which drives studs directly into the tire tread. However, metal studs or ribs are not suitable for all-season driving conditions, and are further subject to restrictions in many locales. Metal studs are also prone to falling out of a tread when installed directly into a tread via conventional means. Further, conventionally installed studs may shift or move during prolonged use.

Additionally, vehicles are subject to a static electric buildup. Many tire treads and tire sidewalls are constructed of compounds having low electric conductivity, and therefore provide a poor pathway for discharging static electricity build-up from the vehicle to the ground.

SUMMARY

In one embodiment, a system for mounting a stud in a tire includes a housing having an interior cavity and at least one aperture. The housing includes at least one anchor proximate to the at least one aperture, and the at least one anchor is initially disposed within the interior cavity of the housing. The system also includes a stud having an elongated body. The elongated body of the stud is configured to fit within the interior cavity of the housing. The elongated body of the stud is configured to bias at least a portion of the at least one anchor through the at least one aperture of the housing when the elongated body of the stud is inserted into the interior cavity of the housing.

In another embodiment, a method for mounting a stud in a tire includes providing a tire, providing a housing having an aperture located on a side of the housing, and installing the housing into the tire. The housing includes an anchor initially biased towards an interior of the housing, and the housing has an opening. The method further includes inserting a stud into the opening of the housing, such that the stud biases the anchor at least partially through the aperture and at least partially into the tire.

In another embodiment, a system for mounting a housing and an insert to a tire includes a housing configured to be installed in a tire, wherein the housing has a top opening. The system also includes at least one anchor connected to a side of the housing in an un-deployed configuration. The system further includes an insert configured to be inserted into the top opening of the housing. The at least one anchor projects outward into the tire when the insert is inserted into the top opening of the housing.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 1 is a partial perspective view of a tire having a plurality of stud assemblies according to an embodiment of the present disclosure;

FIG. 3A is a cross sectional view of the stud assembly of FIGS. 2A and 2B, after the stud has been installed into the housing;

FIG. 3B is a cross sectional view of the stud assembly of FIG. 3A, rotated 90 degrees;

FIGS. 3C-3I are cross sectional views of alternative embodiments of stud assemblies;

DETAILED DESCRIPTION

Figure 2A:
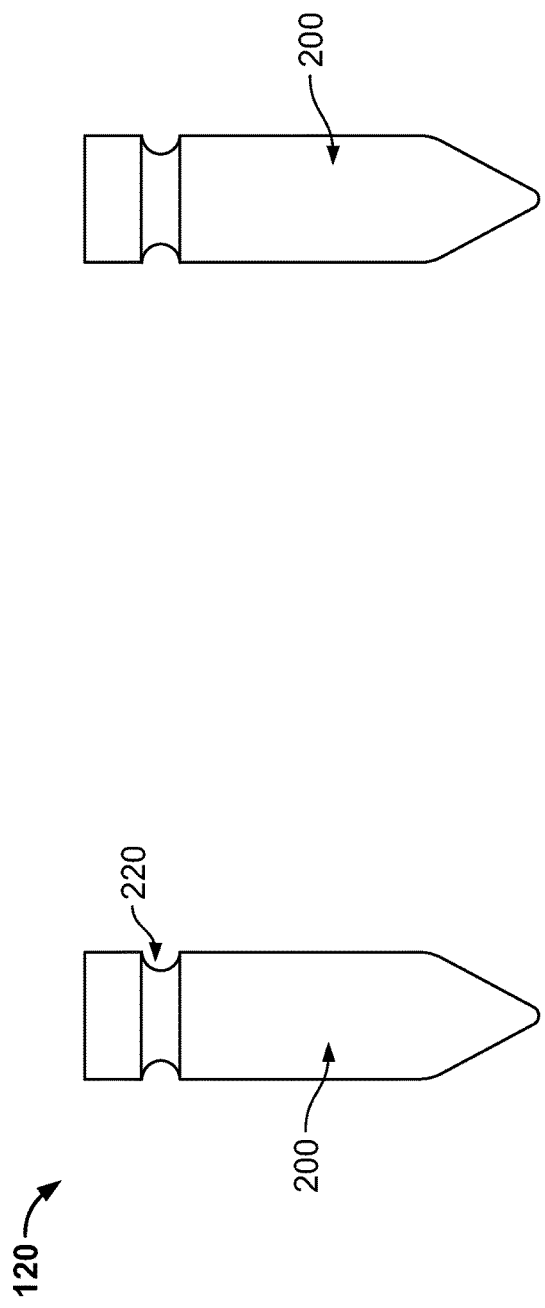
FIG. 2A is a cross sectional, exploded view of one embodiment of a stud assembly comprising a stud and a housing, prior to installation of the stud.

The following includes definitions of selected terms employed herein. The definitions include various examples or forms of components that fall within the scope of a term and that may be used for implementation. The examples are not intended to be limiting. Both singular and plural forms of terms may be within the definitions.

"3D printer" refers to a machine used for 3D printing.

"3D printing" refers to the fabrication of objects through the deposition of a material using a print head, nozzle, or another printer technology.

"Axial" and "axially" refer to a direction that is parallel to the axis of rotation of a tire.

"Bead" refers to the part of the tire that contacts a wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" as used herein, refers to that portion of the tire that comes into contact with the road or ground under normal inflation and normal load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

FIG. 1 illustrates a partial view of a tire 100 having a tread 110 with a plurality of stud assemblies 120 embedded into tread 110. While FIG. 1 depicts an exemplary automobile tire 100 with an exemplary tread pattern, it should be understood that stud assemblies 120 may be used with a broader range of tread patterns and tires. Stud assemblies 120 may be arranged in any type of tread pattern, and in any type of vehicle tire, including automobile tires, summer tires, off road tires, truck tires, mining tires, airplane tires, etc.

In the illustrated embodiment, the stud assemblies 120 are arranged randomly within the tread of the tire 100. In an alternative embodiment (not shown), the stud assemblies may be arranged in a defined pattern. In other alternative embodiments, the stud assemblies may be arranged partially in a pattern and partially randomly. Various arrangements of stud assemblies 120 will be apparent to those of skill in the art to impart desirable performance characteristics to the tire 100.

Figure 2B:
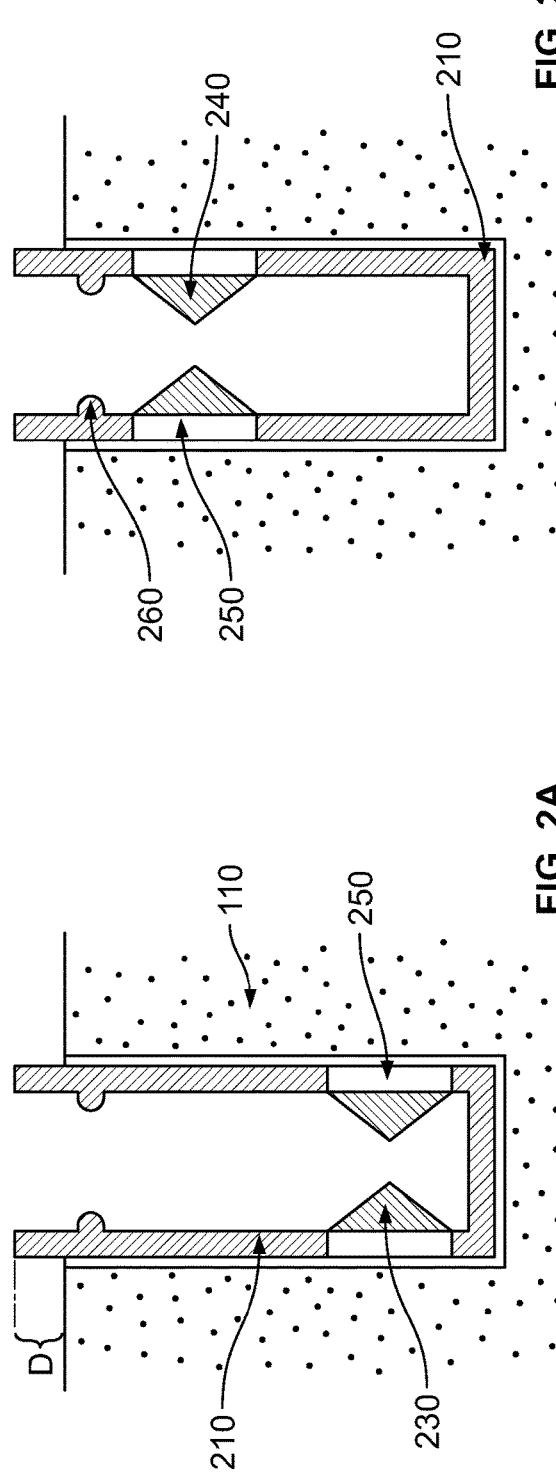
FIG. 2B is a cross sectional, exploded view of the stud assembly of FIG. 2A, rotated 90 degrees.

The stud assemblies 120 are shown in an exploded cross sectional view in FIGS. 2A and 2B. Each stud assembly 120 includes a stud 200 and housing 210. Although conventional studs are metal and may be subject to restrictive regulations in some states or countries, it should be understood that the studs described herein are not limited to metallic studs. In one embodiment, stud 200 and housing 210 are made from a non-metal material (or combination of materials), including but not limited to hardened rubber, plastic, thermoplastic, etc. The materials used are preferably harder than the tire tread 110 material, but may have a hardness equal to or less than tire tread 110 material. In some embodiments, the circumferential rib 260 can be made of a different material than the rest of housing 210. It should be understood, however, that the stud and housing can be made from metal if so desired.

FIG. 2A shows a cross sectional view along a radial plane of the housing 210 and stud 200, while FIG. 2B illustrates the same stud 200 and housing 210, but rotated 90 degrees. In the illustrated embodiment of FIG. 2A, stud 200 is generally cylindrical, and tapered at a bottom end. Additionally, other types of studs may be used without departing from the scope of the present disclosure, including but not limited to studs that are triangular, rectangular, pentagonal, hexagonal, or other studs having any number of sides or shapes. Stud 200 can be manufactured with any manufacturing processes including but not limited to any type of molding or 3D printing. In other embodiments (not shown), the stud 200 may include a bottom end taking different shapes instead of being tapered, such as a bottom end curved, straight, pointed, rounded, etc.

Stud 200 further includes a circumferential groove 220 extending around a circumference of the stud 200 proximate to a top of stud 200. In the embodiment of FIGS. 2A and 2B, the circumferential groove 220 has a semi-circular cross section. In other embodiments (not shown), circumferential groove 220 might have a differently shaped cross section. In other embodiments (not shown), a groove may be provided that does not extend all the way around the respective stud. In other embodiments (not shown), the circumferential groove 220 may be omitted entirely. In still other embodiments (not shown), the circumferential groove 220 may be replaced with a protrusion.

Housing 210 in this embodiment is generally cylindrical and hollow, and is sized and shaped to receive the stud 200. It should be understood that in embodiments where the stud is non-cylindrical, the inside shape of the housing would have a corresponding shape. In the illustrated embodiment, the outside shape of the housing and the inside shape of the housing are both substantially cylindrical. However, in alternative embodiments, the outside shape of the housing can be different than the outside shape of the stud. For example, the shape of the stud can be square and the shape of the housing can be hexagonal.

Housing 210 is embedded in tire tread 110. Housing 210 can be installed into tire tread 110 via any number of means, including but not limited to installation into a cured tire via a manual method such as insertion via a stud gun. Alternatively, the housing may be installed into a tread of a pre-cured tire.

The exterior surface of housing 210 can include various surface finishes, textures, and/or adhesives to improve traction between the housing 210 and the tire tread 110. For example, a roughened housing surface may adhere better to the tire tread. By contrast, a smoother surface may provide easier installation.

Housing 210 is installed such that a top of housing 210 is located a distance D above the surface of tire tread 110. Distance D shown in FIG. 2A can vary based on the specific tire application. For example, different countries or states may have different regulations or specifications concerning the minimum and maximum of distance D that a 'standard' stud can be located above the surface of the tire tread. The embodiment described herein follows the specifications related to countries involved, as well as the experience of one skilled in the art of establishing the distance D. Distance D can extend between 0.0 millimeters (flush with the tread surface) up to 1.5 millimeters, or more. The distance D may be selected as a function of design constraints of the tread, for performance criteria or to conform to the regulation of a country or state involved.

Design constraints may be a function of the hardness of the tread compound, the thickness (depth) of the tread material available, and the location of tread plies. These factors affect the length of penetration of the housing. Solid tread material in the periphery of the housing affects the effective diameter of the housing that can be installed into the tread rubber. In light of such design constraints, the distance D may be selected to reduce lateral forces transmitted in the housing that could weaken the engagement of the housing to the surrounding tire material.

Performance criteria are a function of how tires with these housings and ribs will be used. An example of performance criteria would be seasonal use of tires. As one of ordinary skill in the art would understand, winter tires have higher snow and ice traction requirements that would warrant greater distance D, as well as stronger materials for studs and ribs. By contrast, summer tires require greater rain traction, which would warrant ribs with deeper distance D. Special use tire (for example off-road) would warrant a deeper distance D, as well as stronger materials for studs and ribs.

In alternative embodiments (not shown), housing 210 can be flush with the surface of tire tread 110, or even recessed into the surface of tire tread 110. In other embodiments (not shown), housing 210 includes a flange on an exterior surface thereof that rests against the surface of tread 110 when housing 210 is installed.

With continued reference to FIGS. 2A and 2B, lower anchors 230 and upper anchors 240 are connected to the housing 210 via a hinged connection. Initially, anchors 230, 240 extend generally inwards into the housing 210. In one embodiment, a center of gravity of the anchors 230, 240 causes them to remain within housing 210 initially. In other embodiments (not shown), a biasing mechanism can be provided to bias anchors 230, 240 inside of housing 210. Such a biasing mechanism can include, for example, a spring biasing mechanism such as a torsion spring. While two lower anchors 230 and two upper anchors 240 are shown in the illustrated embodiment, it should be understood that any number of anchors may be employed.

Anchors 230, 240 in the embodiment of FIGS. 2A and 2B have a generally trapezoidal shape. In other embodiments (not shown), lower anchors 230 can take any shape, including but not limited to a triangular shape, rectangular shape, curved shape, hooked shape, pole shape, rounded shape, etc. Anchors 230 in this embodiment are located opposite each other on the housing 210. The top surface of lower anchors 230 is longer than the bottom surface of anchors 230. When deployed, top surface of lower anchors 230 will extend into the tire tread 110 further than the bottom surface of anchors 230. Lower anchors 230 have one cutting edge on the side of lower anchors 230 that extend into the tire tread 110 when installed (as seen in FIGS. 3A and 3B). Lower anchors 230 are connected to the housing 210 at a bottom surface of lower anchors 230, and are initially located inside of housing 210. In an alternative embodiment (not shown), the lower anchors are connected at a top surface of the lower anchors. When deployed, lower anchors 230 engage into tire material 110 to aid in preventing housing 210 from being removed from tire material 110.

Upper anchors 240 are essentially identical to lower anchors 230, except the location of upper anchors 240 is inverted and rotated 90° around housing 210 with respect to lower anchors 230. Further, each upper anchor 240 is connected to housing 210 at a top surface of the upper anchor, rather than a bottom surface. In an alternative embodiment (not shown), the upper anchors have the same orientation as the lower anchors. In another alternative embodiment (not shown), each upper anchor is connected to the housing at a bottom surface of the upper anchor. When deployed, upper anchors 240 engage into tire material 110 to aid in preventing housing 210 from extending deeper into tire material 110.

Housing 210 includes four openings 250 sized and placed to receive anchors 230, 240. When stud 200 is inserted into housing 210, stud 200 pushes anchors 230, 240 through openings 250 from an interior position to an exterior position. Anchors 230,240 have one cutting edge on the sides that extend into the tire tread 110, allowing anchors 230, 240 to cut through the tire tread 110 and extend easily into tire tread when stud 200 is inserted into housing 210 (as seen in FIGS. 3A and 3B). Anchors 230, 240 thus secure housing 210 within tire tread 110, and prevent housing 210 from moving relative to tire tread 110 during use of tire 100.

Additionally, housing 210 includes a circumferential rib 260 located proximate to a top of housing 210. When stud 200 is installed into housing 210, circumferential rib 260 engages the circumferential groove 220 of the stud 200 to it in place relative to housing 210 (as seen in FIGS. 3A and 3B). Stud 200 remains secured within housing 210 when installed in this manner. While the embodiment in FIGS. 2A and 2B depict a groove and rib, any structural locking engagement may be used to secure the stud into the housing, including any shaped protrusion and corresponding recess. In other embodiments (not shown), the groove and rib may be switched, so that the circumferential rib 260 is located on the stud 200 and the circumferential groove 220 is located on the housing 210. Stud 200 and housing 210 may alternatively or additionally be threaded so that stud 200 may be screwed into housing 210. In other embodiments (not shown), circumferential groove 220 and circumferential rib 260 can be omitted entirely.

In the above-described embodiments, the stud 200 can be removed and replaced as needed. For example, a worn stud can be replaced with a new stud. As another example, a stud configured for snow use can be replaced with a stud configured for summer use at the end of winter. As yet another example, a stud with an older design may be replaced with a stud having an updated design.

In an alternative embodiment (not shown), stud and housing may be manufactured together as a single piece, with the insert located within housing and the insert not engaging the anchors. In this alternative embodiment, the anchors will be deployed when the insert is pushed into the housing during installation into tire. Stud and housing can be manufactured using a conventional manufacturing process, or by 3D printing.

In another alternative embodiment (not shown), the stud and housing can be manufactured together as a single piece, with the stud located at a top of the housing. Such a configuration may be used for ease of manufacture, transportation, or storage. In this embodiment, the stud and housing would be separated prior to installation. For example, the stud may be snapped off of the top of the housing to be inserted into the housing. In this embodiment, the anchors of housing will be deployed only when the stud is inserted into the housing. Stud and housing can be manufactured using any manufacturing process, including but not limited to a molding process, an extruding process, machining process, cold forming process, or an additive manufacturing process, such as 3D printing.

FIGS. 3A and 3B depict the same view of stud assemblies 120 of FIGS. 2A and 2B, after stud 200 has been installed into housing 210. As seen in FIGS. 3A and 3B, anchors 230, 240 extend into tire tread 110, and secure housing 210 from moving up or down, or rotating relative to tire tread 110.

Lower anchors 230 in this embodiment are depicted as trapezoidal in cross section, but may be made from any shape in practice. In this embodiment, cross section of lower anchors 230 are narrower at an end connected to housing 210, and are wider at an end that extends further into tire tread 110. The shapes of lower anchors 230 prevents housing 210 from moving upwards and out of tire tread 110. Upper anchors 240 are oriented 180 degrees from lower anchors 230, and prevent housing 210 from being pushed further into tire tread 110. All anchors 230, 240 prevent the housing 210 from being rotated relative to tire tread 110.

With continued reference to FIGS. 3A and 3B, it can be seen that circumferential groove 220 interfaces with circumferential rib 260. Stud 200 can be removed from housings 210 for replacement as needed.

FIGS. 3C-3H are cross sectional views of alternative embodiments of stud assemblies. In FIG. 3C, the stud assembly 300c includes a stud 310c and a housing 320c. The housing 320c includes a flange 330c having a thickness D, which causes the stud 310c and housing 320c to extend outwards from the tread by the distance D. The stud 310c and the housing 320c together act as a stud having a larger geometry including both components together. The stud 310c and the housing 320c may each have a smooth finish, or one or both may have a textured finish.

In FIG. 3D, the stud assembly 300d includes a stud 310d and a housing 320d. The stud 310d includes an enlarged cap portion 330d having a thickness D, which causes the stud 310d to extend outwards from the tread by the distance D. The stud 310d may have a smooth finish or a textured finish.

In FIG. 3E, the stud assembly 300e includes a stud 310e and a housing 320e. As in assembly 300d, the stud 310e includes an enlarged cap portion 330e having a thickness D, which causes the stud 310e to extend outwards from the tread by the distance D. In this embodiment, the cap portion has a concave top surface. The stud 310e may have a smooth finish or a textured finish.

In FIG. 3F, the stud assembly 300f includes a stud 310f and a housing 320f. As in assembly 300d and 300e, the stud 310f includes an enlarged cap portion 330f having a thickness D, which causes the stud 310f to extend outwards from the tread by the distance D. In this embodiment, the cap portion has a convex top surface. The stud 310f may have a smooth finish or a textured finish.

In FIG. 3G, the stud assembly 300g includes a stud 310g and a housing 320g. In this embodiment, both the stud 310g and the housing 320g are flush with the tread surface. The stud 310e may have a smooth finish or a textured finish.

In FIG. 3H, the stud assembly 300h includes a stud 310h and a housing 320h. In this embodiment, the stud 310h extends outwards from the tread by the distance D, with a flat point shape as shown. The shape of the stud extension can be flat point, round point, pointed, concave or convex, or other shapes. The housing 320h is flush with the tread surface. The stud 310h and the housing 320h may each have a smooth finish, or one or both may have a textured finish.

In any of the stud assemblies described above with reference to FIGS. 2A, 2B, and 3A-3H, at least a portion of the housing, the insert, or both may be made of an electrically conductive material. In such embodiments, the base may extend into an electrically conductive subtread. An electrically conductive subtread may be made entirely of an electrically conductive material, or it may have an electrically conductive portion.

The electrically conductive subtread forms all or a part of a path to a bead region of the tire. For example, the electrically conductive subtread may contact an electrically conductive portion of a sidewall, a carcass ply, reinforcement ply, or other component.

The conductive housing or insert can be made from the same material as the electrically conductive material in the subtread. In an alternative embodiment, the housing or insert are made from different materials than the subtread. In one embodiment, the electrically conductive material may be any material having a resistivity less than $2 \times 10^6$ ohm-cm. In an alternative embodiment, the electrically conductive material is any material having a resistivity less than $1 \times 10^6$ ohm-cm. In another alternative embodiment, the electrically conductive material is any material having a resistivity less than $1 \times 10^5$ ohm-cm. In still another alternative embodiment, the electrically conductive material is any material having a resistivity less than $1 \times 10^7$ ohm-cm. In yet another alternative embodiment, the electrically conductive material is any material having a resistivity less than $1 \times 10^8$ ohm-cm. In still another alternative embodiment, the electrically conductive material is any material having a resistivity less than $2 \times 10^8$ ohm-cm. Exemplary electrically conductive materials include, without limitation, copper, aluminum, steel, and other metals, carbon black and other carbonized rubber, and other natural and synthetic resins, epoxies, and other materials.

In one embodiment, the housing or the insert can be made of non-conductive material and include an electrically conductive path. For example, an electrically conductive element may be embedded into the housing or insert using 3D printing process. As another example, the electrically conductive element is embedded by a molding or stamping process. As still another example, the electrically conductive element is embedded by a co-extrusion process.

Figure 3I:
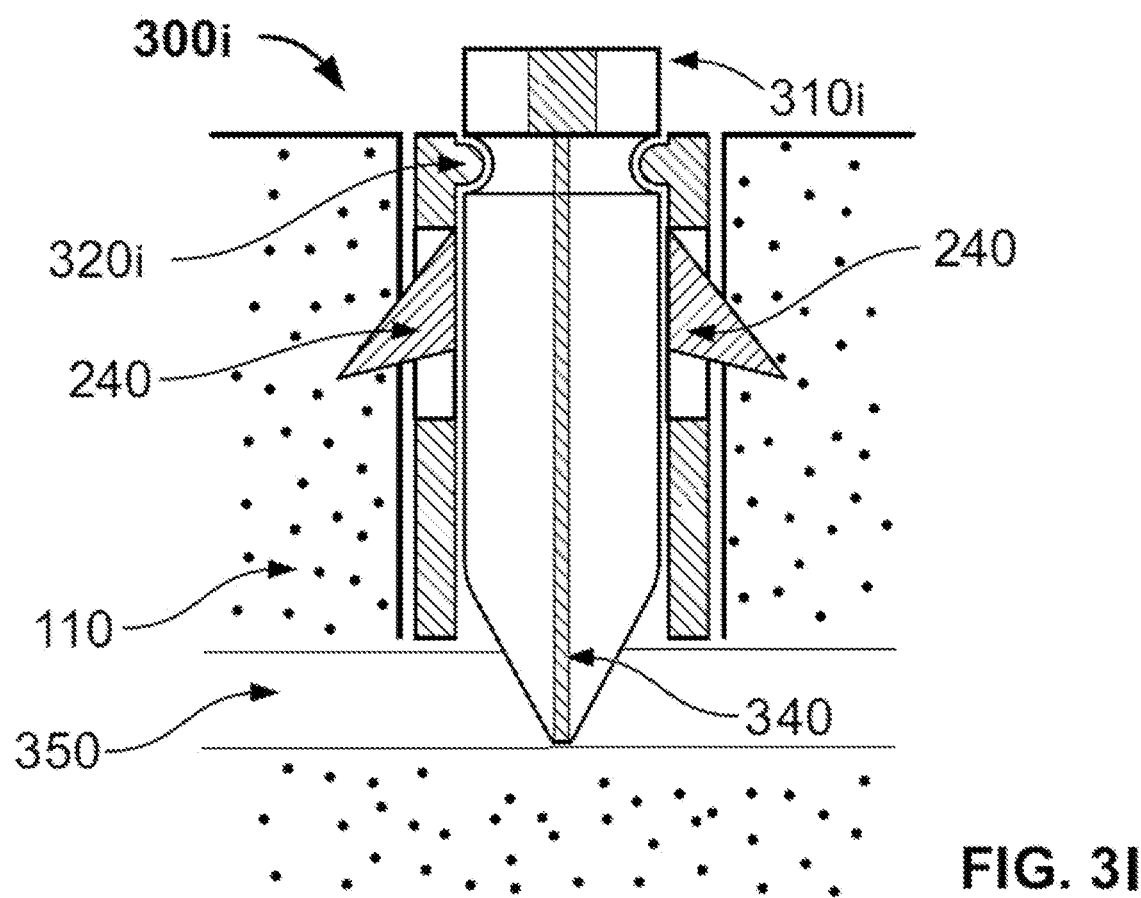

FIG. 3I is a cross sectional view of one embodiment of a stud assembly 300i having an electrically conductive pathway. The stud assembly 300i includes a stud 310i and a housing 320i. The housing 320i includes anchors 240, such as those described above in reference to FIGS. 2A and 2B, and is embedded in a tire tread 110. The stud 310i includes an electrically conductive portion 340 and the stud 310i extends into an electrically conductive subtread 350. In the illustrated embodiment, the stud 310i has a pointed bottom that extends into the electrically conductive subtread 350 without extending below the electrically conductive subtread. In alternative embodiments, the bottom of the stud may be flat, rounded, or have other shapes.

The electrically conductive portion 340 may be cylindrical, cuboid, or have any geometric shape. Where the stud 310i is formed through a 3D printing process, a skilled operator may produce a stud and electrically conductive portion of any geometric shape. In the illustrated embodiment, the electrically conductive portion 340 has a larger width (or diameter) at the top of the stud 310i, and a smaller width (or diameter) through the body of the stud. In an alternative embodiment, the electrically conductive portion 340 has the same width along its entire length. In another alternative embodiment, the electrically conductive portion 340 has three or more varying widths.

In the illustrated embodiment, the housing 320i has an open bottom, which allows the bottom end of the stud 310i to extend into the electrically conductive subtread 350. In an alternative embodiment, the housing has a closed bottom and extends into the electrically conductive subtread. In such an embodiment, the housing includes an electrically conductive portion.

In one embodiment, the electrically conductive portion 340 is formed in the stud 310i by a 3D printing or additive manufacturing process. In an alternative embodiment, the electrically conductive portion 340 is formed in the stud 310*i* by a molding or stamping process. In another alternative embodiment, the electrically conductive portion 340 is formed in the stud 310*i* by a co-extrusion process.

It should be understood that FIG. 3I is merely one example of an electrically conductive stud assembly, and these principles may be applied to any of the other embodiments disclosed herein.

Figure 4A:
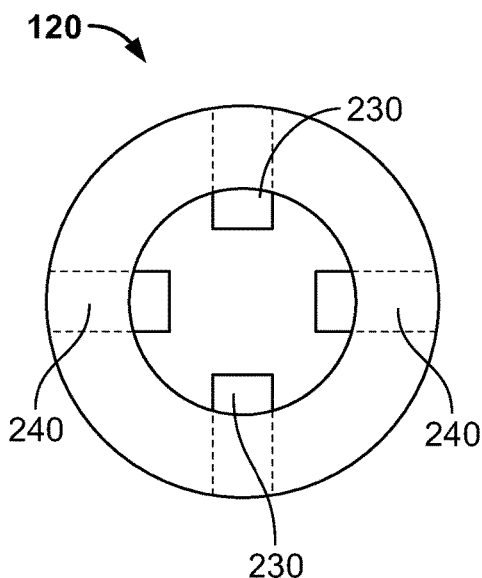
FIG. 4A is a top view of the housing of FIGS. 2A, 2B, before the stud has been installed into the housing.
Figure 4B:
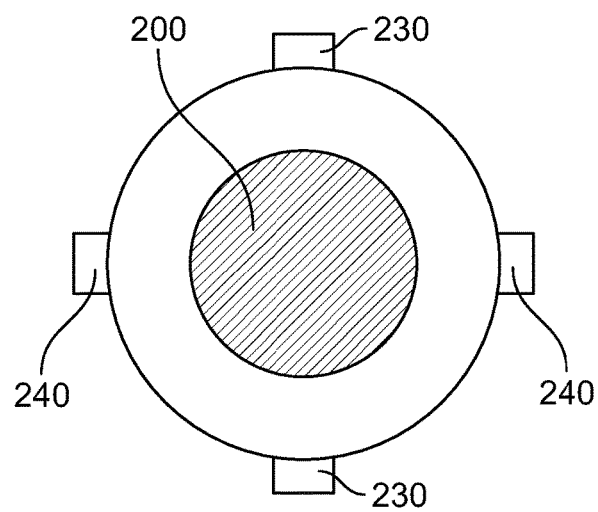
FIG. 4B is a top view of the installed stud assembly of FIGS. 3A, 3B, after the stud has been installed into the housing.

FIGS. 4A and 4B illustrate a top view of the stud assemblies 120 shown in FIGS. 2 and 3, respectively. As can be seen in FIG. 4A, the anchors 230, 240 are located within housing 210 prior to insertion of the stud 200. When stud 200 is deployed, as seen in FIG. 4B, anchors are extended outside of housing 210 and into tire tread 110.

Figure 5A:
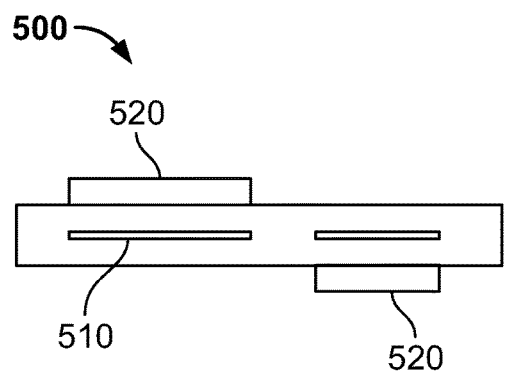
FIG. 5A is a top view of one embodiment of a rib according to another embodiment of the present disclosure.
Figure 5B:
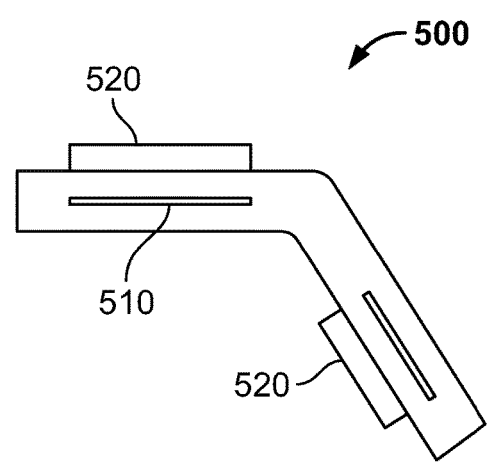
FIG. 5B is a top view of one embodiment of an angled rib according to another embodiment of the present disclosure.

Tire tread traction and/or handling may further be improved through the use of ribs connected to the tread in a similar manner as discussed above with respect to studs 200. FIGS. 5A and 5B depict this embodiment of the present disclosure. Ribs 500 can be mounted onto a tire tread to augment tire tread pattern grooves and lateral slots to improve the channeling of rain, mud, and snow. Ribs 500 can also aid in improving tire tread pattern traction on snow and ice. FIGS. 5A and 5B illustrate a rib 500 according to the present disclosure. Rib 500 can be connected to the tread or sidewalls of a tire in a manner similar to those discussed above with respect to the studs. Rib 500 includes one or more slots 510, and anchors 520 that deploy when an insert (not shown) is inserted into one of the slots 510. The anchors 520 are initially biased inside of ribs 500, similar to the anchors discussed above with respect to the studs. When an insert is inserted into slots 510, the insert forces the anchors 520 into the tire tread, securing the rib in place. Anchors 520 may include one edge with a cutting surface so that anchors 520 can cut through the tire tread material when extended into tire tread. Slots 510 can be centered along a width of rib 500, or can be closer to one edge of rib 500. In FIG. 5A, a straight rib 500 is shown, and in FIG. 5B, an angled rib 500 is shown. Ribs 500 can be shaped or arranged in any manner to create any type of tread pattern on the tread of a tire. Further, ribs 500 may be installed in this same manner onto the sidewalls of a tire, to for function, decoration, and/or brand enhancement.

Ribs 500 can be made from a material having a hardness higher than the hardness of the underlying material in the tire tread or sidewall. Alternatively, the ribs 500 may have a hardness equal to or less than the hardness of the underlying material in the tire tread or sidewall. Additionally, the inserts may be made from a material having a hardness higher than the hardness of the underlying material in the tire tread or sidewall. Alternatively, the inserts may have a hardness equal to or less than the hardness of the underlying material in the tire tread or sidewall.

In the above-described embodiments, the inserts can be removed and replaced as needed. For example, a worn insert can be replaced with a new insert. As another example, an insert configured for snow use can be replaced with an insert configured for summer use at the end of winter. As yet another example, an insert with an older design may be replaced with an insert having an updated design.

Figure 6A:
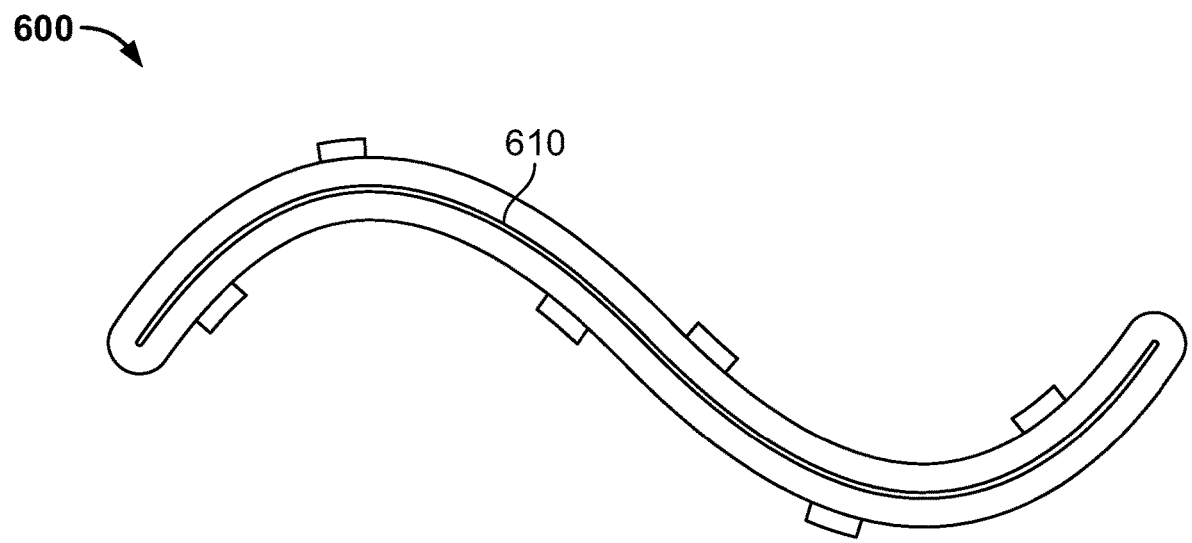
FIG. 6A is a top view of one embodiment of a curved rib according to another embodiment of the present disclosure.
Figure 6B:
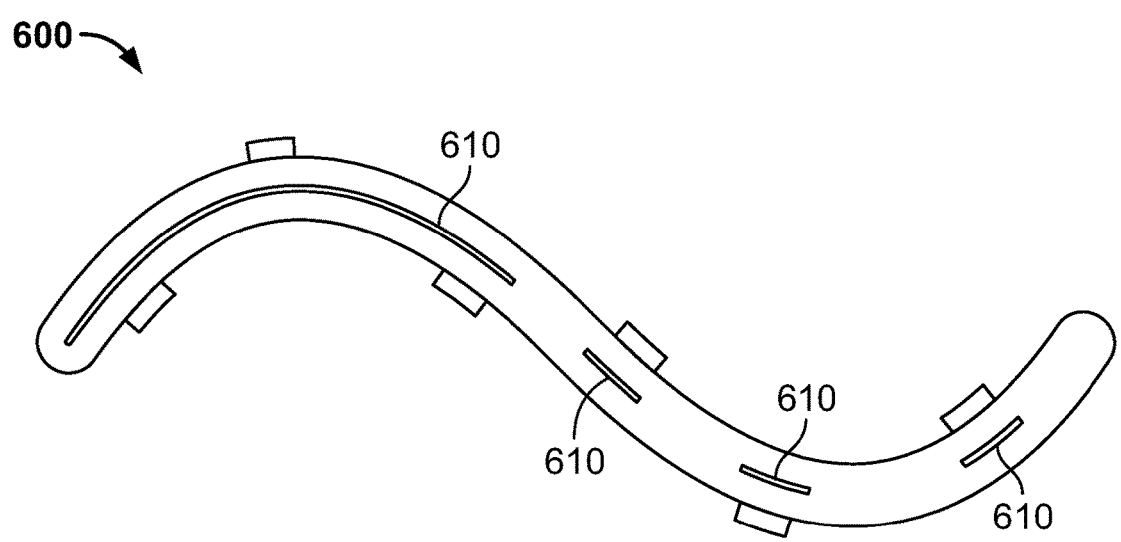
FIG. 6B is a top view of an alternative embodiment of a curved rib having off-center slots according to another embodiment of the present disclosure.

FIGS. 6A and 6B depict curved rib 600. Curved rib 600 can take any shape, but is depicted here with a serpentine shape. Curved rib 600 otherwise functions in the same manner as the rib 500 of FIGS. 5A and 5B. FIG. 6A depicts curved rib 600 with a single slot 610 along a center of the width of curved rib 600. Curved rib 600 in FIG. 6B depicts an embodiment where many slots 610 can be provided that do not align with a center of the width of curved rib 600.

Figure 7:
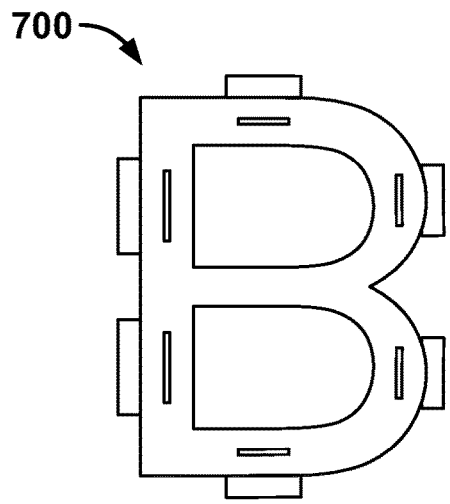
FIG. 7 is a plan view of one embodiment of a decorative rib according to another embodiment of the present disclosure.

FIG. 7 depicts an exemplary decorative rib 700 of the present disclosure. Rib 700 is installed into the tire tread. Providing there is ample material thickness, rib 700 could be installed onto a sidewall (not shown) of a tire in the manner described above with respect to FIGS. 5A and 5B. Rib 700 can be formed using the same processes discussed above with respect to FIGS. 5A and 5B. Rib 700 is an example of a brand enhancement rib. Rib 700 can take the form of a logo, trademark, design, phrase, word, letter, number, or any other shape for decorative or brand enhancement purposes.

Ribs 700 can take any color scheme for decorative or brand enhancement purposes. For example, the rib may include an insert having a non-black color. The use of non-black inserts may obviate the need to use non-black rubber during an initial tire build before curing.

Figure 8:
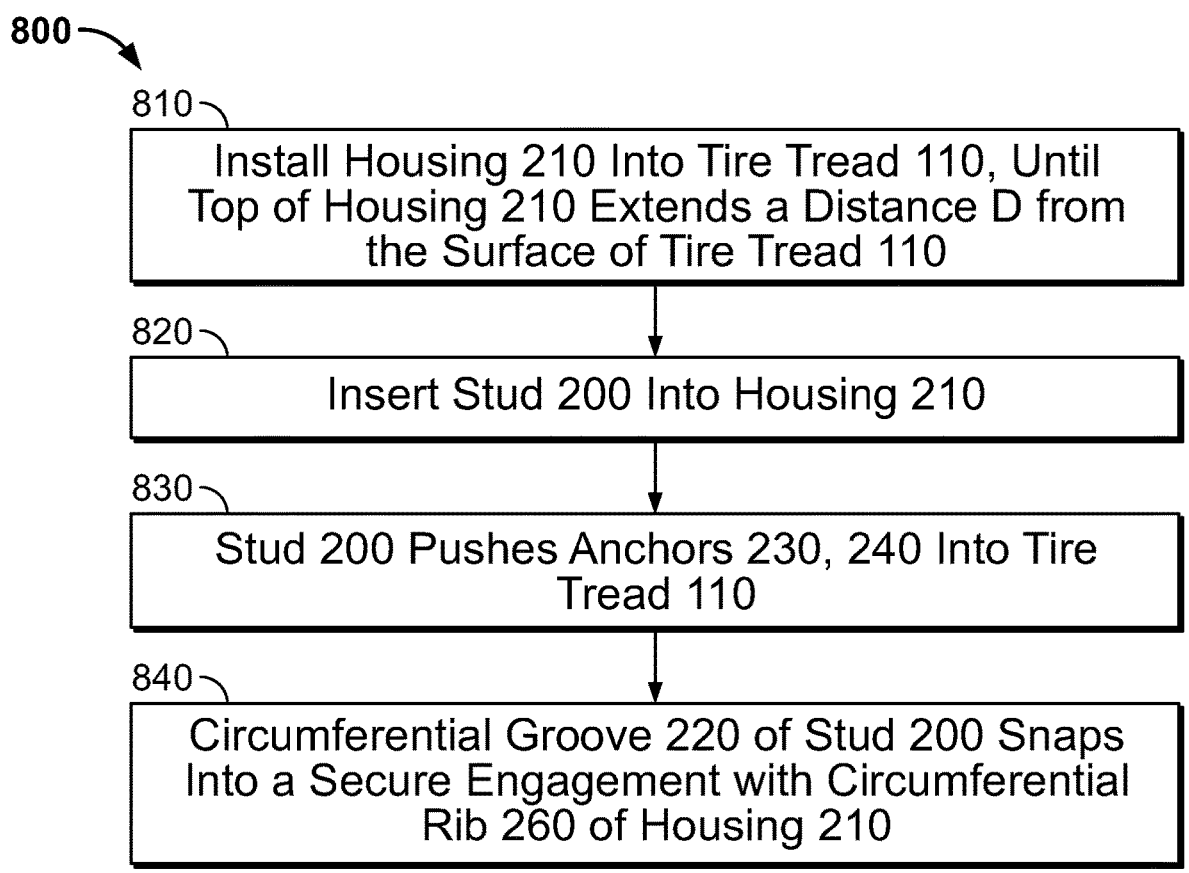
FIG. 8 is a flow chart of a method for installing a stud into a tire.

FIG. 8 illustrates an exemplary method 800 for installing the stud assemblies 120, discussed above with respect to FIGS. 1-4B. The method 800 is exemplary only, and other methods may be used to install stud assemblies 120 and ribs 500, 600, 700. First step 810 involves installing the housing 210 into a tire tread 110 by manual means, until a top of housing 210 is a desired distance D from the surface of the tire tread 110. Step 810 can be performed using conventional means such as a stud gun or other apparatus for implanting the housing into the tire tread 110. At step 820, stud 200 is inserted into housing 210. At step 830, the stud pushes anchors 230, 240 into tire tread 110 to secure the housing 210 within tire tread 110. Finally, at step 840, the circumferential groove 220 snaps into a secure engagement with circumferential rib 260.

Figure 9:
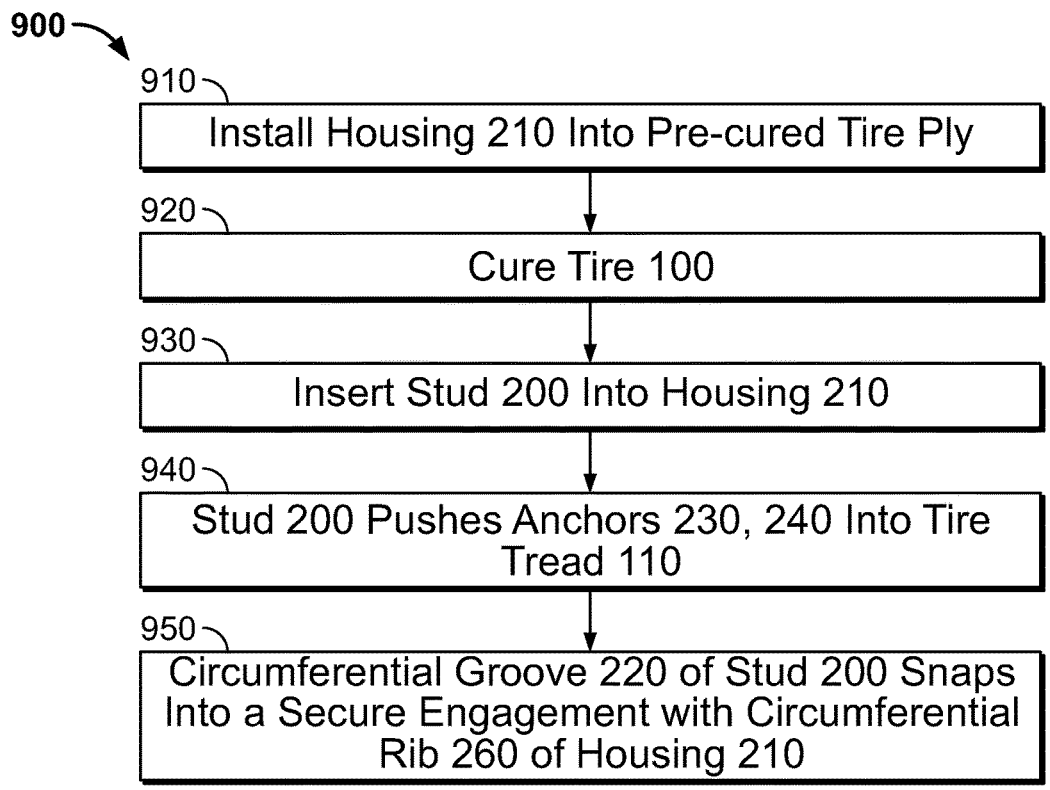
FIG. 9 is a flow chart of a method for installing a stud into a tire.

FIG. 9 illustrates an alternative method 900 for installing the stud assemblies 120, discussed above with respect to FIGS. 1-4B. The method 900 is exemplary only, and other methods may be used to install stud assemblies 120 and ribs 500, 600, 700. First step 910 involves installing the housing 210 into a pre-cured or partially pre-cured tire ply by manual means. Step 910 can be performed using conventional means such as a stud gun or other apparatus for implanting the housing into the pre-cured tire ply. Next, at step 920, the tire 100 is cured. At step 930, stud 200 is inserted into housing 210. At step 940, the stud 200 pushes anchors 230, 240 into tire tread 110 to secure the housing 210 within tire tread 110. Finally, at step 950, the circumferential groove 220 snaps into a secure engagement with circumferential rib 260.

Figure 10:
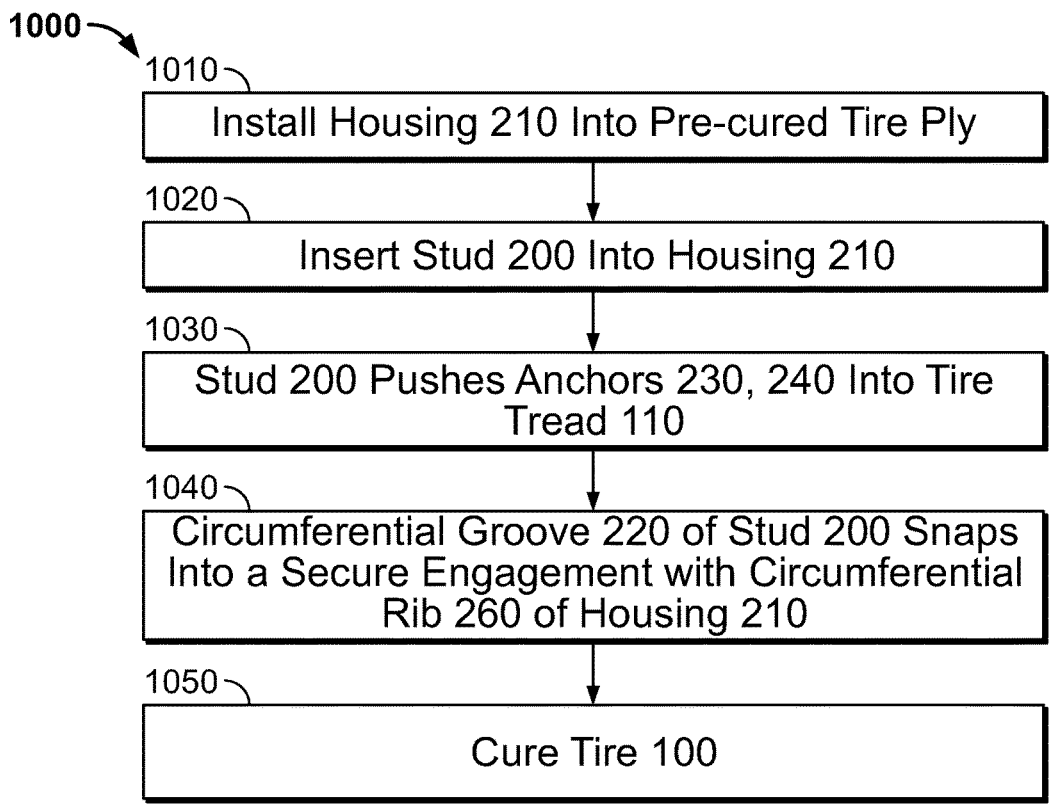
FIG. 10 is a flow chart of a method for installing a stud into a tire.

FIG. 10 illustrates another alternative method 1000 for installing the stud assemblies 120, discussed above with respect to FIGS. 1-4B. First step 1010 involves installing the housing 210 into a pre-cured or partially pre-cured tire ply by manual means. At step 1020, stud 200 is inserted into housing 210. At step 1030, the stud 200 pushes anchors 230, 240 into tire tread 110 to secure the housing 210 within tire tread 110. Next, at step 1040, the circumferential groove 220 snaps into a secure engagement with circumferential rib 260. Finally, at step 1050, the tire 100 is cured.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A system for mounting a stud in a tire, comprising:
    a housing having an interior cavity and at least one aperture,
        wherein the housing includes at least one anchor proximate to the at least one aperture, the at least one anchor being initially disposed within the interior cavity of the housing; and
    a stud having an elongated body,
        wherein the elongated body of the stud is configured to fit within the interior cavity of the housing,
        wherein the elongated body of the stud is configured to bias at least a portion of the at least one anchor through the at least one aperture of the housing when the elongated body of the stud is inserted into the interior cavity of the housing,
        wherein each anchor is hingedly mounted to the housing at a top of a corresponding aperture, and
        wherein a bottom portion of each anchor is biased through the corresponding aperture when the stud is inserted into the interior cavity of the housing.

2. The system of claim 1, wherein the housing is cylindrical,
    wherein the housing has a circumference, and
    wherein the housing includes at least two anchors positioned at an equal distance from each other along the circumference of the housing.

3. The system of claim 1, wherein the housing further includes a rib along an interior surface of the housing,
    wherein the stud includes a groove located along an outer circumferential surface of the stud, and
    wherein the groove is configured to receive the rib when the stud is inserted into the interior cavity of the housing.

4. The system of claim 1, wherein the stud is at least partially conical.

5. The system of claim 1, wherein the stud is formed from a non-metallic material.

6. The system of claim 1, further including an adhesive applied to an outer surface of the housing.

7. The system of claim 1, wherein the housing and the stud are formed from a 3D printing process.

8. A system for mounting a stud in a tire, comprising:
    a housing having an interior cavity and at least one aperture,
        wherein the housing includes at least one anchor proximate to the at least one aperture, the at least one anchor being initially disposed within the interior cavity of the housing; and
    a stud having an elongated body,
        wherein the elongated body of the stud is configured to fit within the interior cavity of the housing,
        wherein the elongated body of the stud is configured to bias at least a portion of the at least one anchor through the at least one aperture of the housing when the elongated body of the stud is inserted into the interior cavity of the housing,
        wherein each anchor is hingedly mounted to the housing at a bottom of a corresponding aperture, and
        wherein a top portion of each anchor is biased through the corresponding aperture when the stud is inserted into the interior cavity of the housing.

9. The system of claim 8, wherein the housing is cylindrical,
    wherein the housing has a circumference, and
    wherein the housing includes at least two anchors positioned at an equal distance from each other along the circumference of the housing.

10. The system of claim 8, wherein the housing further includes a rib along an interior surface of the housing,
    wherein the stud includes a groove located along an outer circumferential surface of the stud, and
    wherein the groove is configured to receive the rib when the stud is inserted into the interior cavity of the housing.

11. The system of claim 8, wherein the stud is at least partially conical.

12. The system of claim 8, wherein the stud is formed from a non-metallic material.

13. The system of claim 8, further including an adhesive applied to an outer surface of the housing.

14. The system of claim 8, wherein the housing and the stud are formed from a 3D printing process.

* * * * *